UNITED STATES PATENT OFFICE.

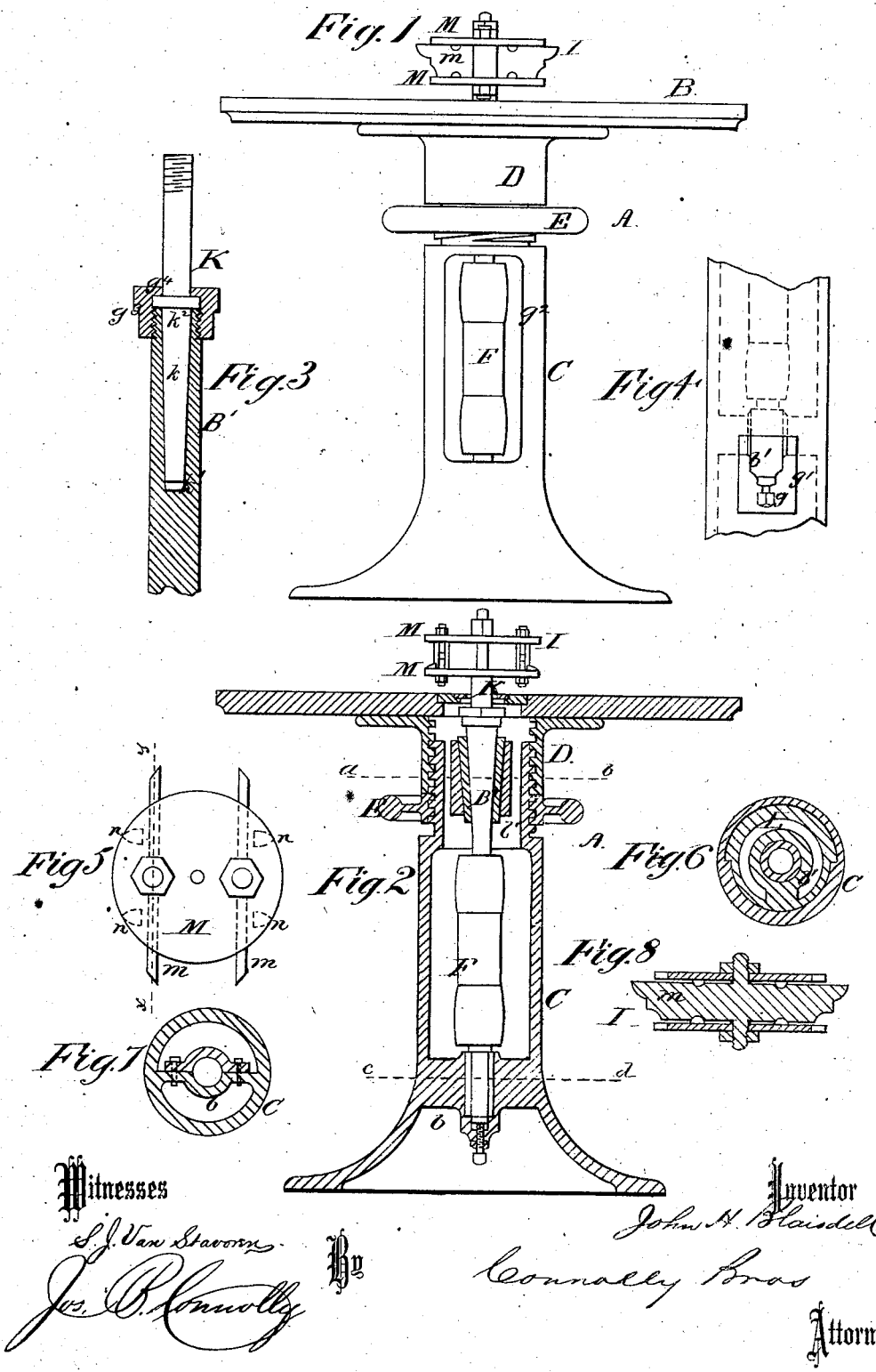

JOHN H. BLAISDELL, OF PHILADELPHIA, PENNSYLVANIA.

IMPROVEMENT IN MOLDING-MACHINES.

Specification forming part of Letters Patent No. 162,343, dated April 20, 1875; application filed January 11, 1875.

*To all whom it may concern:*

Be it known that I, J. H. BLAISDELL, of Philadelphia, in the county of Philadelphia and State of Pennsylvania, have invented certain new and useful Molding-Machine; and I do hereby declare the following to be a full, clear, and exact description of the invention, such as will enable others skilled in the art to which it pertains to make and use it, reference being had to the accompanying drawings, which form part of this specification, in which—

Figure 1 is a side elevation of my invention. Fig. 2 is a vertical central section of same. Fig. 3 is a section in detail of main shaft with cutter-spindle. Fig. 4 is a side view of part of supporting-column. Fig. 5 is a plan view of cutter-head. Fig 6 is a section on line $a\,b$ of Fig. 2. Fig. 7 is a section on line $c\,d$ of Fig. 2. Fig. 8 is a section on line $x\,y$ of Fig. 5.

This invention has relation to certain improvements in that class of molding and shaping machines in which the work is performed by means of cutters secured to a rotary vertical shaft, and operating above a horizontal work-table.

These improvements consists, first, in the novel construction of a molding and shaping machine, having a single central pedestal or column containing a central vertical shaft, and surmounted by an adjustable work-table. Secondly, in the combination of a central hollow supporting-column, an inclosed vertical rotary shaft, a cutter-head, and an adjustable work-table, constituting a molding and shaping machine. Thirdly, in the peculiar construction of the cutter-head and novel arrangement of the cutters, so that one of the latter shall be caused to clear the work while the other is cutting. Fourthly, in the general novel construction and combination of parts, all as hereinafter specified.

Referring to the accompanying drawings, A designates the frame of a molding and shaping machine embodying my improvements.

Heretofore, in machines of the class to which mine belongs, it has been customary to employ a stationary table and adjustable cutters. To overcome many disadvantages of this construction, I employ an adjustable table, B, which, for the purposes of adjustment, is mounted upon the single central column or pedestal C.

The upper end of said column is threaded externally to correspond with the internally-threaded neck D with which the table is provided, and which fits over and works upon said column.

E designates a hand-wheel, having a threaded hub working upon the threaded portion of the column. This wheel is designed to serve as a check for the retention of the table at any desired height.

As intimated already, the column C is hollow, and it is provided with the internal shaft and spindle-bearings $b\,b'$. In this form the column receives the main shaft B' and cutter-spindle, which are connected together, and turn in the bearings or boxes $b\,b'$. The shaft is provided with a suitable belt-pulley, F, through which forward and reverse motion is given to the shaft and cutter-head. Said shaft turns in its bearing $b$ upon a screw, $g$, which is used to take up wear. Access is had to said screw through an opening, $g^1$, in the side of the column. Another opening, $g^2$, serves for the passage of the driving-belt.

I designates the cutter-head, and K the spindle thereof. The latter is detachable from the shaft, and is secured rigidly thereto by means of a nut, $g^3$, flanged internally at $g^4$. The spindle has an elongated tapering shank, $k$, which enters a corresponding socket, $k^1$, in the end of the shaft, and is formed with an encircling ridge or collar, $k^2$, which rests upon the end of the shaft, and is embraced by the nut. L represents a segmental space, between the spindle-bearing $b'$ and the adjacent surface of the column, for the passage of shavings or cuttings.

The cutter-head comprises two disks, M M, and two cutters, $m\,m$. The latter are swiveled at their middle points to allow play, so that while one is cutting the other clears the surface operated upon. Studs $n\,n$, rising from one or both disks, limit the play of the cutters.

Having fully described my invention, I claim as new and desire to secure by Letters Patent—

1. A molding and shaping machine, having a single central pedestal or column, and an adjustable work-table, substantially as described.

2. The molding and shaping machine, consisting of the central hollow column or pedestal C, inclosed central shaft B′, cutter I, and adjustable work-table B, combined substanstantially as shown and described.

3. The spindle K, having a tapering shank, $k$, and an annular flange, $k^2$, in combination with the shaft B′, having a correspondingly-tapering socket, $k^1$, and the nut $g^3$, substantially as shown and described.

4. The cutter-head I, having swiveled cutters M M, and studs or stops $n\ n$, substantially as and for the purpose specified.

In testimony that I claim the foregoing, I have hereunto set my hand this 2d day of January, 1875.

JOHN H. BLAISDELL.

Witnesses:
   THOS. A. CONNOLLY,
   M. DANL. CONNOLLY.